United States Patent [19]

Tohchi et al.

[11] Patent Number: 5,179,684
[45] Date of Patent: Jan. 12, 1993

[54] METHOD OF CHANGING THE TRACK AND RECORDING DATA

[75] Inventors: Mamoru Tohchi; Akira Kurano; Hisaharu Takeuchi; Yukihisa Kashima; Ikuo Kawaguchi, all of Odawara, Japan

[73] Assignee: Hitachi, Ltd., Tokyo, Japan

[21] Appl. No.: 394,537

[22] Filed: Aug. 16, 1989

[30] Foreign Application Priority Data

Aug. 26, 1988 [JP] Japan .................. 63-212076

[51] Int. Cl.⁵ ............................ G11B 15/12
[52] U.S. Cl. ..................... 395/425; 360/63
[58] Field of Search ........... 395/400, 425; 360/61, 360/63

[56] References Cited

U.S. PATENT DOCUMENTS

| 4,084,231 | 4/1978 | Capozzi et al. | 395/425 |
| 4,722,085 | 1/1988 | Flora et al. | 371/38 |
| 4,761,785 | 8/1988 | Clark et al. | 371/51 |

FOREIGN PATENT DOCUMENTS 63-83967 4/1988 Japan .

OTHER PUBLICATIONS

Daniels, S., *Massenspeicher-Handbuch fur Mikrocomputer*, FELTRON Electronik, Troisdorf, pp. 129-132 (1987).

Primary Examiner—Joseph L. Dixon
Assistant Examiner—David L. Robertson
Attorney, Agent, or Firm—Kenyon & Kenyon

[57] ABSTRACT

An external memory device subsystem and a data recording device, which issue a command specifying a plurality of tracks (surfaces) in a rotary type memory device prior to a read or write instruction being issued from the data processing unit of higher rank to the rotary type memory device through a control unit; selects sequentially the plurality of individual tracks (surfaces) previously specified when executing a read or write command after the receipt of the command; and in this way can read/write continuously without wait time interruptions when data is discontinuous.

11 Claims, 4 Drawing Sheets

50

DEFINE TRACK SELECT —51
SEEK —52
SEARCH ID —53
TIC —54
READ MCKD —55
MSEARCH ID —56

```
                            90
  READ MCKD  — 91
  SEEK HEAD  — 92
  SEARCH ID  — 93
  TIC        — 94
```

METHOD OF CHANGING THE TRACK AND RECORDING DATA

BACKGROUND OF THE INVENTION

The present invention relates to a track changing technique and a data recording technique for a rotary type memory device, and in particular to a technique useful for increasing the access speed to a plurality of non-consecutive tracks, within a cylinder.

For example, in an electronic computer system for general use, using a large scale magnetic disk device as an external memory device is known.

In such a magnetic disk device a plurality of coaxial circular tracks are normally disposed in each of a plurality of magnetic disks. These disks are normally rotatably mounted around an axis. Data is normally managed by using each of the cylinders as unit. Such a device is a logical concept constituted by a plurality of tracks equidistant from the center of rotation of the magnetic disks. Relatively high speed access to those tracks is possible only by an operation of selecting a head without any seek operation based on the movement of the head in the radial direction of the magnetic disks.

The so-called CKD (Count, Key, Data) format is the leading recording format for each of individual track.

That is, each of a plurality of records stored in the tracks is composed of a count area, a key area and a data area, which are arranged with a predetermined gap between each other. The count area includes recorded positioning information on the relevant record within the memory device as well as management information such as the lengths of the key area and the data area, etc. The key area includes search information for searching the data area. The data area includes real data.

Preparing a predetermined processing for each of the successive areas is effected when the head passes through each of the gaps.

However, recently, as the disk device is more and more fixed and the capacity thereof increases, the demand for high speed data transfer becomes stronger. To respond to this demand, there is a tendency to remove wait time for rotation due to the processing of the tracks one after another by dealing with a plurality of tracks in a lump (continuous processing) and on the other hand to shorten the processing time as well as to reduce the number of tapes by decreasing the amount of data by the fact that all the tracks are not wholly dumped/restored. However, only the updated track is selectively done in a dumping operation, by which data are shunted from a magnetic disk to a magnetic tape, etc. or a restoring operation, by which the data are returned from the magnetic tape to the original magnetic disk or from another magnetic disk to the disk.

For this purpose dealing with discontinuous tracks on a same cylinder in a lump becomes necessary.

For this reason, in a magnetic disk device, for which the CKD method is adopted as described above, (e.g., a SEEK HEAD command for changing tracks in a same cylinder) a command with multitrack instruction, etc. are used.

However, by the former (i.e., SEEK HEAD command) since receiving a track number for each of the tracks from the central processing unit of higher rank of the subsystem for every execution is necessary, completing this command during a time period within the time when the head on a gap peculiar to the CKD method is not possible. Consequently repositioning the read/write head by the succeeding reading command is necessary and therefore dealing with the succeeding record without wait time for rotation is not possible. In addition, executing this SEEK HEAD command before the reading command is necessary and therefore the overhead thereof cannot be neglected.

On the other hand, the latter (i.e., command with multitrack instruction) executes the head changing operation at the track starting point (index marker), while securing the positioning of the read/write head, and necessarily selects the following adjacent track.

For this reason, to continue the processing for a non-adjacent track, issuing commands with multitrack instruction several times and waiting for rotation until the index for changing as many times is necessary. Unfortunately, as a consequence more waits for rotation take place with increasing distance between the present track and the succeeding target track.

Therefore, according to the prior art technique, the former (i.e. SEEK HEAD command) is used. However since the processing time for executing this command is great, as described above, a large gap behind the track is necessary for absorbing this overhead when changing the track. Further, repositioning the head is also required.

When a data format is adopted, by which the tracks are almost fully utilized to secure the memory capacity of the magnetic disk device, as is the current common practice, useless time for one rotation inevitably takes place for continuously dealing with non-adjacent tracks. This increases the time necessary for transferring and receiving data between the central processing unit and the magnetic disk device.

Further, as a data recording method for avoiding the wait time for rotation in the magnetic disk device, known techniques are disclosed, e.g. in JP-A-63-83967.

That is, according to this technique, the wait time for rotation when moving and changing the head from a track on a certain cylinder to another track on the next cylinder is avoided by setting the position of the index marker of the tracks and shifting it for different cylinders.

However, according to this technique, since the positions of the index markers of the tracks within each of the cylinders are the same, no effect can be obtained for avoiding the wait time for rotation at the head changing within a same cylinder.

SUMMARY OF THE INVENTION

An object of the present invention is to provide a method of changing the track permitting continuous access without giving rise to the wait time for rotation for a plurality of non-adjacent tracks within a same cylinder.

Another object of the present invention is to provide a method of recording data permitting continuous access without giving rise to the wait time for rotation for a plurality of non-adjacent tracks within a same cylinder.

The outline of an representative among the present inventions disclosed in the present application will be explained below, as follows.

The method of the present invention is used in an external memory device subsystem consisting of a rotary type memory device, a memory control unit, and a data processing unit. The rotary type memory device carries out at least one of reading and writing data from- /on a plurality of coaxial, circular tracks of a rotary type memory medium. The memory control unit is disposed between the rotary type memory device and the data processing unit. The data processing unit is of a higher order than the memory control unit. The memory control unit controls the transfer and receipt of data between the data processing unit and the rotary type memory device according to reading or writing instructions issued by the data processing unit to the memory control unit. The method of changing the track according to the present invention comprises command means for previously specifying a plurality of tracks before the reading or writing instruction issued by the data processing unit stated above and track change-over means for continuously selecting the plurality of tracks specified by the command means at executing the reading or writing instruction, after the command means has executed the operation stated above.

Further, in a rotary type memory device, in which the head is positioned on a plurality of coaxial and circular tracks of a rotary type memory medium and at least one of reading and writing data from/on the rotary type memory medium is effected through this head, the method of recording data according to the present invention adds a gap to the front or rear end portion of each of the tracks without impairing the nominal memory capacity thereof so that selecting an arbitrary one of the tracks by changing the head corresponding thereto is terminated when the head passes through the gap.

By means of the method of changing the track described above according to the present invention, the tedious operation of receiving a track number from the processing device for every track change etc. (e.g., as by the prior art SEEK HEAD command) is avoided. In this way, continuously accessing a plurality of tracks distant from each other within the same cylinder without giving rise to any wait time for rotation is possible.

Further, by the method of recording data according to the present invention, since the time necessary for changing the head from the present track to the next track located at an arbitrary position distant therefrom (e.g., according to the prior art SEEK HEAD command) is absorbed by the gap disposed at the front or rear end portion of each of the tracks, continuously accessing a plurality of tracks distant from each other within the same cylinder without giving rise to any wait time for rotation is possible.

DETAILED DESCRIPTION

EMBODIMENT 1

Figure 1:
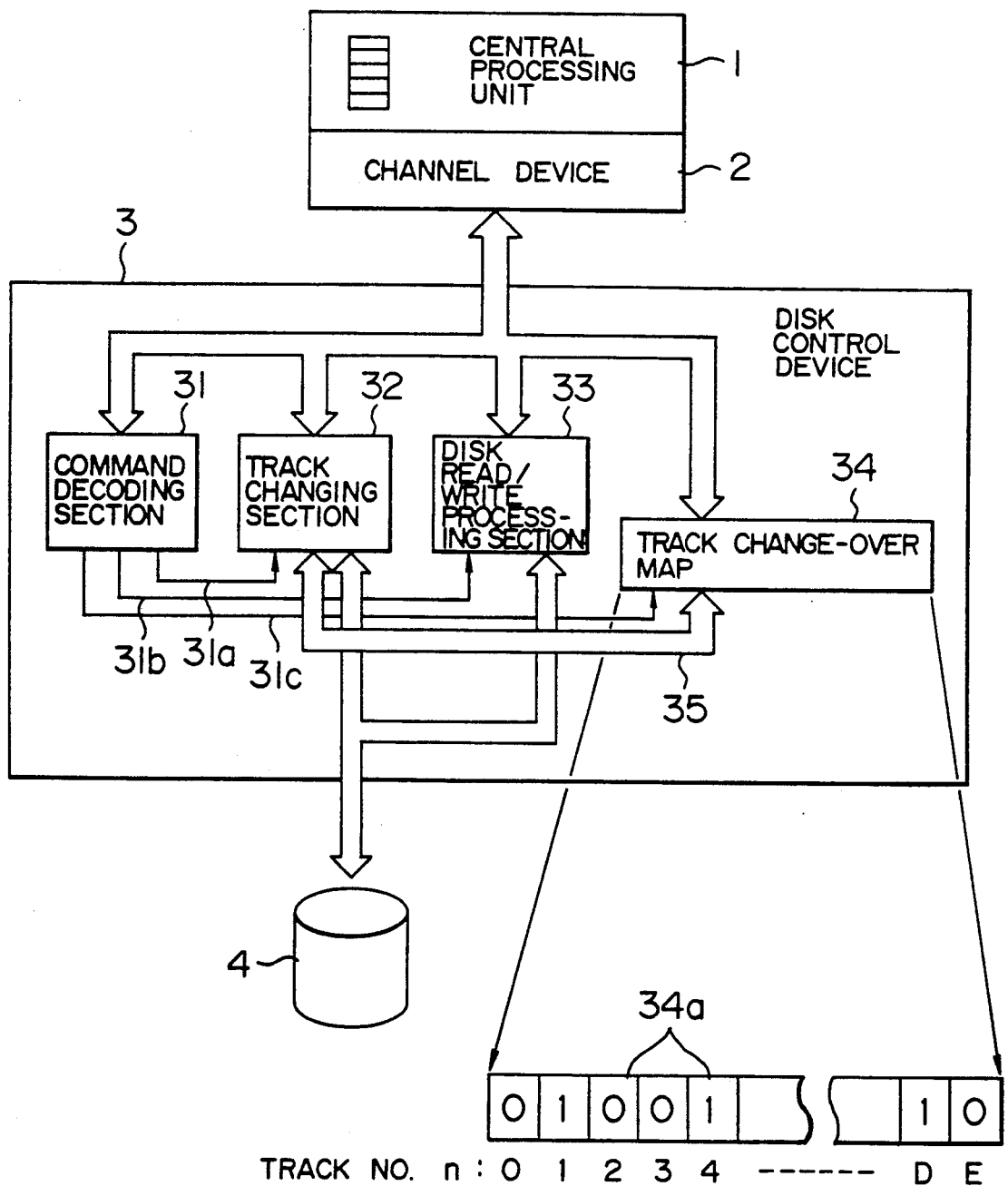
FIG. 1 is a block diagram showing an example of the system construction, where an external memory device subsystem, which is an embodiment of the present invention, is incorporated in an electronic computer system for general use.
Figure 2:
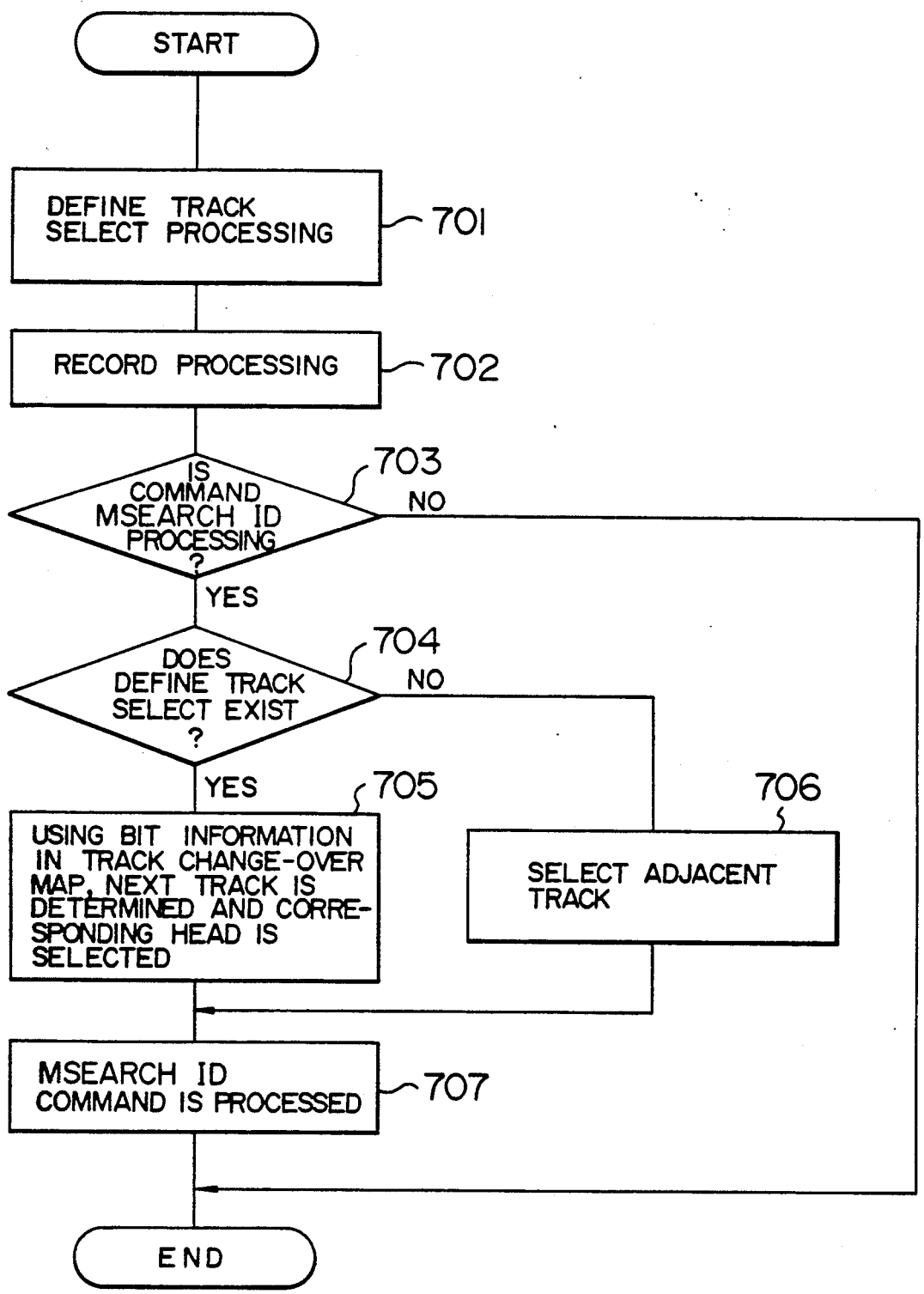
FIG. 2 is a flow chart showing an example of the working mode of the subsystem indicated in FIG. 1.

FIG. 1 is a block diagram showing an example of the system construction, where an external memory device subsystem, which is an embodiment of the present invention, is incorporated in an electronic computer system for general use and FIG. 2 is a flow chart showing the working mode thereof.

An external memory subsystem consisting of a disk control unit 3 (memory control unit) and a magnetic disk device 4 (rotary type memory device) is connected, e.g., with a central processing unit 1 (higher rank data processing unit) in an electronic computer for general use through a channel 2. The channel 2 controls the transfer and receipt of data and commands between the central processing unit 1 and the exterior.

Figures 3, 4:
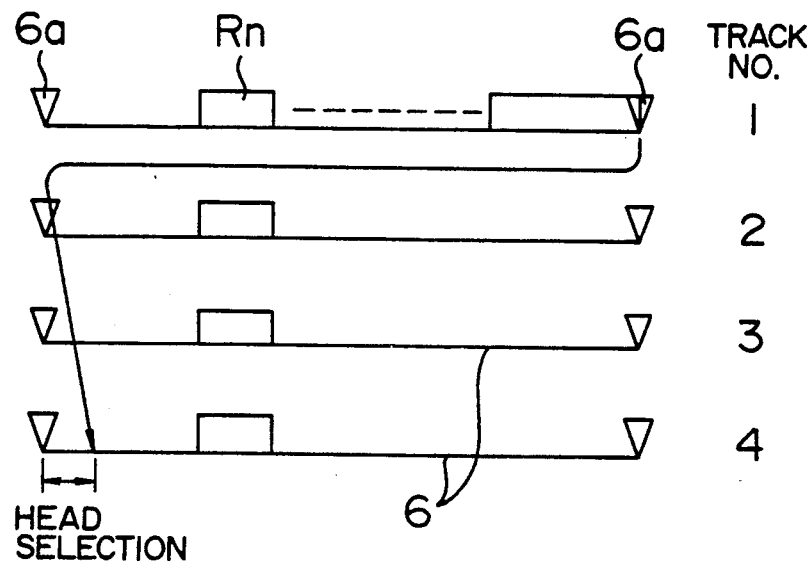
FIG. 3 is a scheme showing an example of a channel command word (hereinbelow abbreviated to CCW or called simply command) chain.
FIG. 4 is a conceptual scheme of a track, in which the record is stored.

The control of input and output data between the central processing unit 1 and the magnetic disk device 4, is carried out through the channel 2 and the disk control unit 3, and is effected by a CCW chain 50 (FIG. 3). The CCW chain consists of a series of CCWs issued from the central processing unit 1 to the disk control unit 3 through the channel 2.

That is, the disk control unit 3 is provided with a command decoding section 31, a track changing section 32, and a disk read/write processing section 33. The command decoding section deciphers each of the commands coming from the channel 2. The track changing section 32 (track changing means) is started by a control signal 31a coming from the command decoding section 31. The disk read/write processing section 33 is started by a control signal 31b similarly coming from the command decoding section 31 and controls the transfer of the data between the magnetic disk device 4 and the channel 2.

The disk control unit 3 also includes a track change-over map 34 having a predetermined bit width.

Here, the track change-over map 34 is constructed so as to hold bit information 34a corresponding to the number of tracks for one cylinder in the magnetic disk device 4.

That is, the magnetic disk device 4 in the present embodiment includes 8 magnetic disks (not shown in the figure). Each of the 8 disks has recording surfaces on both of its sides. 15 tracks, which are equidistant from the center of rotation constitute one cylinder. Each of the 16 recording surfaces includes a track except for one recording surface, on which servo information for controlling the positioning of the head is recorded. The tracks are referred to by track numbers from O (i.e., 0000) to E (i.e., 1110). Bit information 34a corresponding to each track is stored in the track change-over map 34.

When the input of a control signal 31c is transmitted by the command decoding section 31 to the track change-over map 34 and when the relevant DEFINE TRACK SELECT command 51 (command means) reaches the track change-over map 34, track "n" (specified by the DEFINE TRACK SELECT command 51) is set at "1" and the other tracks are set "0".

Further, the track change-over map 34 is connected with the track changing section 32 through a signal line 35. The track changing section 32 instructs the change of the head (not shown in the figure) for the magnetic disk device 4 without requiring the tedious operation of receiving a track number from the channel device 2 of higher rank of the subsystem for every track change. Rather, the track changing section 32 instructs the change of the head based on the bit information 34a in the track change-over map 34.

On the other hand FIG. 3 shows an example of the CCW chain 50 used in the present embodiment.

At first, the DEFINE TRACK SELECT command 51 is a command peculiar to the present embodiment and information for a plurality of tracks specified by this parameter is held, as described previously by the fact that the bit information corresponding to the track number n corresponding to the track change-over map 34 disposed in the disk control unit 3 is set at "1".

Further, a SEEK command 52 is a command for effecting a seek operation of positioning the head at the target cylinder by moving the head in the radial direction of the magnetic disk serving as the recording medium.

Still further, a SEARCH ID command 53 is a command for positioning the head at the aimed record within the track. That is, by the recording method according to the CKD method, as in the present embodiment, the count area in each record is read out and whether the record read out is the target record or not is checked based on identification information such as the cylinder number, the track number, the record number, etc., recorded within each count areas.

A TIC command 54 executes a branching operation under condition within the CCW chain based on the termination condition of the directly preceding command in the CCW chain 50. In this embodiment, when the preceding SEARCH ID command 53 described above determines that the record read out is not the targeted record, the TIC command effects an operation of repeating the SEARCH ID command 53.

Furthermore, a READ MCKD command 55 is a command for reading out all the records after the present position of the head in an arbitrary track.

An MSEARCH ID command 56 is a SEARCH ID command with a multitrack instruction.

That is, the present MSEARCH ID command 56 detects usually an index marker 6a indicating the front end (rear end) of each of the tracks indicated in FIG. 4 and effects at the same time automatically the track changing operation from the present track 6 to the adjacent track 6. Rn represents a record which consists of a count area, a key area and a data area.

An example of the operation of the external memory device subsystem used in the present embodiment is described below.

At first, when a DEFINE TRACK SELECT command 51 is issued by the central processing unit 1 through the channel 2, the command decoding section 31 in the disk control unit 3 deciphers the present command and transmits the control signal 31c to start the track change-over map 34. At this moment, information on the combination of a plurality of tracks 6 specified as parameters accompanied by the relevant DEFINE TRACK SELECT command 51 is set for individual bit information 34a in the track change-over map 34.

Next, according to the SEEK command 52, the head is positioned on the target cylinder in the magnetic disk device 4.

Further an operation of searching for the target record $R_n$ in the target track 6 is effected by the SEARCH ID command 53. This searching operation is repeated by the TIC command 54, until the target record is found. After the target record has been found, an operation of reading out all the records succeeding the relevant record until the end in the relevant track is effected by the following READ MCKD command 55 and the records read out are transferred to the channel 2 side through the disk read/write processing section 33.

Further, receiving the MSEARCH ID command 56, the command decoding section 31 starts the track changing section 32 and the track change-over map 34 through the control lines 31a and 31c.

In this way the track changing section 32 can know the track number n of the track, for which the present track should be changed, referring to the bit information in the track change-over map 34.

Then the track changing section 32 decides which corresponding head it selects, based on the track number n taken-in from the track change-over map 34.

The head number and the track number within the cylinder correspond to each other. For example, in the present embodiment, supposing that the track corresponding to the head selected at present has track number 1 since the succeeding bit information 34a, which is "1", in the track change-over map 34 corresponds to track number 4, the head corresponding to track number 4, which should be dealt with, succeeding the present track number 1, is selected.

At the same time, the track changing section 32 examines the track change-over map 34 to determine whether there are heads (tracks), which should be dealt with, following the head (track) selected at present, or not.

This operation is automatically executed, independent of whether the bit of the track number n corresponding to the head selected at present is "1" or "0", when an index marker 6a is detected during the execution of the MSEARCH ID command 56.

At this time, if no DEFINE TRACK SELECT command 51 has been issued, just as by the prior art method, the had of the track of track number (n+1) directly succeeding the track of track number n corresponding to the head selected at present is selected.

On the other hand, where a DEFINE TRACK SELECT command 51 has been already issued, the next head corresponding to the next aimed track number n is seeked, referring to the map change-over map 34, and the track changing section 32 instructs the magnetic disk device to select that head.

At this time, the processing time of selecting the head effected by the track changing section 32, referring to the track change-over map 34, is equal to the processing time of selecting the head corresponding to the track directly succeeding the present track by the prior art MSEARCH ID command 56, even if the corresponding tracks is distant from the present track within the present cylinder.

In this way selecting the head corresponding to the track located at an arbitrary position distant from the present track within the same cylinder in the same way as the head corresponding to the directly succeeding track is selected by the prior art MSEARCH ID command 56 is possible and thus waiting for rotation for every change-over of the track, where tracks, which are at discrete positions within a cylinder, are accessed successively, etc., is not necessary.

In this way, the time necessary for the processing for transferring data of records, etc. between the central processing unit 1 and the magnetic disk device 4 is shortened and thus the performance of the external memory device subsystem is improved.

This will be explained, referring to the flow chart indicated in FIG. 2. At first, after the execution of the DEFINE TRACK SELECT command 51 (Step 701), the targeted processing for the record is executed (Step 702).

Then whether the command is an MSEARCH ID command 56 is determined (Step 703). If it is, whether a DEFINE TRACK SELECT command 51 has been executed or not is determined (Step 704).

If it has been executed, the track number n (head number), which should be dealt with next, is obtained, referring to the bit information 34a, which has been already set in the track change-over map 34 by the parameters accompanied by the relevant DEFINE TRACK SELECT command 51 and the head corresponding to the track of track number n is selected (Step 705).

On the contrary, if no DEFINE TRACK SELECT command 51 has been executed before the MSEARCH ID command 56, the operation of the MSEARCH ID command 56 is identical to that of the prior art technique and the head corresponding to the adjacent track, whose track number is greater by 1 than the present track number n, is selected (Step 706).

Thereafter the MSEARCH ID command 56 is executed (Step 707).

In this way, in the execution of the CCW chain 50 according to the present embodiment (e.g. supposing that the track number of the present track is 1, as indicated in FIG. 4), when an index marker 6a is detected at the execution of the MSEARCH ID command 56, the head corresponding to the track of track number 4, which should be dealt with next, is selected automatically.

In this way, successively dealing with even a plurality of tracks located, not at successive but at discrete positions, is possible without wait for ration.

EMBODIMENT 2

Figures 5, 6:
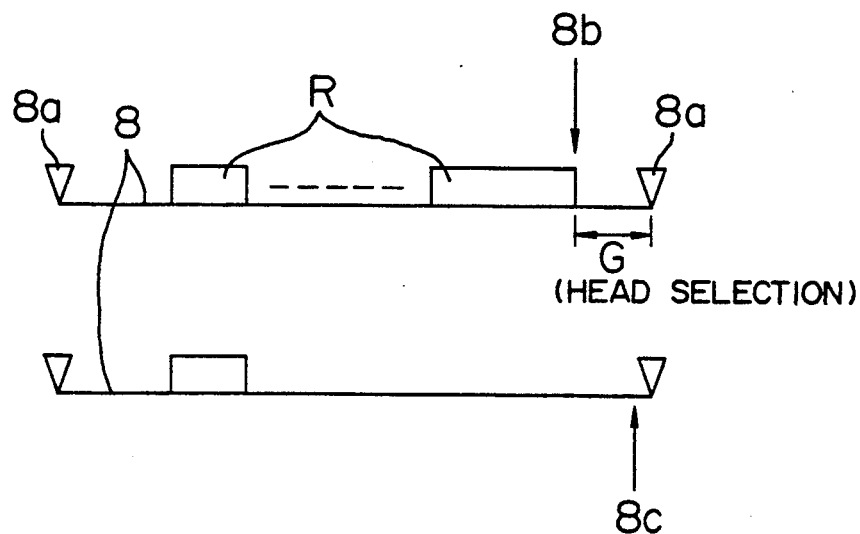
FIG. 5 is a conceptual scheme of a track by the method of recording data, which is an embodiment of the present invention.
FIG. 6 is a scheme showing an example of a prior art CCW chain.

FIG. 5 is a conceptual scheme of a track 8 illustrating an example of the data recording method, and FIG. 6 shows an example of the CCW composed of conventional well-known CCWs.

That is, the inevitable wait time for rotation of the prior art method when changing tracks distant from each other without modifying the conventional CCW chain 90 may be conceivably avoided by disposing a small capacity gap, which is not dealt with at all, at the rear end of the track 8. However, when that method is used, the data recording region suffers from influences of the small capacity gap. As a result, the predetermined nominal memory capacity of one track is reduced.

Therefore, in the present embodiment, the memory capacity of the track 8 is held at a predetermined nominal value by increasing the bit density somewhat.

That is, in a representative device working at present, since the number of rotations of the magnetic disk is 3600 rpm, the time necessary for one turn is 16.7 ms. Further, since the time necessary for the head changeover is about 100 $\mu$s, in the present embodiment, the bit density is increased by 0.6% to maintain the nominal capacity of the track when making a gap G corresponding to a head pass time a little over 100 $\mu$s.

The bit density may be easily increased by about 0.6% by using known methods.

FIG. 5 is a conceptional scheme in the case where a gap G is disposed on the rear end side of the individual track 8, while increasing the bit density by about 0.6% in this way.

That is, the size of the gap G disposed on the rear end side of the individual track 8 is determined so as to compensate the time necessary for the selection of another arbitrary track 8 (head) by the SEEK HEAD command 92 without wait time for rotation after the processing of all the records R in the relevant track 8 has been terminated.

In this way, (e.g., in the prior art CCW chain 90 indicated in FIG. 6) the head position 8b is at the starting point of the coming gap G after having dealt with an arbitrary track n by a READ MCKD 61 dealing with all the records R after a specified record R within one track 8.

A change-over operation to an arbitrary track 8 by the SEEK HEAD 92 is executed in the gap G and this change-over operation is terminated before the arrival at the index marker 8a in the relevant 8.

That is, the head position 8c just after the changeover operation is located on the forward side of the index marker 8a.

In this way, continuously accessing a plurality of tracks 8 located at discrete positions within the same cylinder without wait time for rotation is still possible even when using the conventional SEARCH ID 93.

The same is also true for the writing operation.

Clearly, the same effect can also be obtained by positioning the gap G just after the index marker 8a in the track 8, i.e., on the front end side of the track 8.

Although the present invention has been exemplified based on preferred embodiments, the present invention is not restricted to the embodiments, but various modifications are possible without departing from the general methods of the present invention.

For example, embodiments 1 and 2 may be combined.

We claim:

1. A storage control unit for an external data storage device of the rotary type having a plurality of concentric tracks on which data is written to and read from, said storage control unit being a lower order device, disposed between a read/write processing device of higher order which controls data transfer between itself and the external data storage device in response to read and write instructions, comprising:
   a) a command decoder, specifying a plurality of tracks before said read and write instructions are transferred by said data processing unit, receiving a command output from said data processing unit and decoding said received command;
   b) a track change-over device continuously selecting said plurality of tracks specified by said command decoder, and holding bit information based on said plurality of tracks specified by said command decoder; and
   c) a track changer changing to a track selected from said plurality of tracks based on said bit information held by said track change-over device.

2. The unit as claimed in claim 1 and further including:
   d) a processor in said unit executing all read or write instructions from said command decoder.

3. The unit as claimed in claim 1 wherein said command decoder provides starting signals to said track changer, said read/write processing device, and said track change-over device.

4. The unit as claimed in claim 2 wherein said command decoder provides starting signals to said track changer, said read/write processing device, and said track change-over device.

5. The unit as claimed in claim 1 wherein said continuous selection of said plurality of tracks specified by said command decoder performed by said track change-over device is executed without waiting for any instruction from said data processing unit.

6. The unit as claimed in claim 1 wherein said holding of bit information by said track change-over device is performed by a track change-over map.

7. The subsystem as claimed in claim 6 wherein said track change-over map is a bit map including a plurality of bits.

8. The subsystem as claimed in claim 7 wherein each of said plurality of bits may represent a track.

9. The subsystem as claimed in claim 8 wherein subsequent bits represent consecutively addressed tracks.

10. The subsystem as claimed in claim 9 wherein a bit having a "1" binary value indicates a track to be written to or read from, and a bit having a "0" binary value indicates a track to skip.

11. A method for processing data for a rotating storage device having a plurality of concentric tracks arranged on a storage medium, using a head to read information from, and write information to said storage medium, and using a data processing unit, comprising steps of:
 a) outputting a command for specifying a plurality of tracks of said storage device from said data processing unit;
 b) outputting a read or write command from said data processing unit after step (a);
 c) storing information based on said command for specifying a plurality of tracks;
 d) reading said stored information;
 e) selecting one of said plurality of tracks specified based on said information read out;
 f) executing said read or write instruction at said selected track; and
 g) repeating steps (d) through (f) until all information is read or written.

* * * * *

UNITED STATES PATENT AND TRADEMARK OFFICE
CERTIFICATE OF CORRECTION

PATENT NO. : 5,179,684
DATED : January 12, 1993
INVENTOR(S) : Mamoru Tohchi et al It is certified that error appears in the above-indentified patent and that said Letters Patent is hereby corrected as shown below:

Column 6, line 39, "the had of" should read -- the head of --.
Column 10, line 3, After "data" change "for" to -- from --.

Signed and Sealed this

Twenty-third Day of November, 1993

Attest:

BRUCE LEHMAN

*Attesting Officer*     *Commissioner of Patents and Trademarks*